US012770904B2

(12) United States Patent
Ridenour et al.

(10) Patent No.: US 12,770,904 B2
(45) Date of Patent: Oct. 20, 2026

(54) AMMONIUM BOROPHOSPHATE AS A PROTON CONDUCTING SOLID ELECTROLYTE FOR SOLID ACID FUEL CELLS

(71) Applicant: The Government of the United States of America, as represented by the Secretary of the Navy, Arlington, VA (US)

(72) Inventors: James August Ridenour, Alexandria, VA (US); Brian L. Chaloux, Alexandria, VA (US); Albert Epshteyn, Potomac, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 651 days.

(21) Appl. No.: 18/213,933

(22) Filed: Jun. 26, 2023

(65) Prior Publication Data

US 2023/0420717 A1 Dec. 28, 2023

Related U.S. Application Data

(60) Provisional application No. 63/356,082, filed on Jun. 28, 2022.

(51) Int. Cl.

| | |
|---|---|
| ***H01M 8/1016*** | (2016.01) |
| ***C01B 35/14*** | (2006.01) |
| ***C25B 13/05*** | (2021.01) |
| ***H01M 8/18*** | (2006.01) |

(52) U.S. Cl.
CPC ......... *H01M 8/1016* (2013.01); *C01B 35/146* (2013.01); *C25B 13/05* (2021.01); *H01M 8/188* (2013.01); *H01M 2300/0068* (2013.01)

(58) Field of Classification Search
CPC ............... H01M 8/1016; H01M 8/188; H01M 2300/0068; C25B 13/05; C01B 35/146
See application file for complete search history.

(56) References Cited

U.S. PATENT DOCUMENTS

| | | | | |
|---|---|---|---|---|
| 11,296,346 B2 | 4/2022 | Epshteyn et al. | | |
| 2012/0108713 A1 * | 5/2012 | Ewald | C08K 3/38 | 524/133 |

OTHER PUBLICATIONS

Forg, Synthesis, Crystal Structure of a New Structure Type, and Thermal Analysis of the Ammonium Borophosphate (NH4)2[B2P3O11(OH)], Z. Anorg. Allg. Chem. 2017, 643, 766-771 (Year: 2017).*

Shi, Impetus for solvothermal synthesis technique: synthesis and structure of a novel 1-D borophosphate using ionic liquid as medium, Journal of Solid State Chemistry 176 (2003) 33-36 (Year: 2003).*

Inorg. Chem. 2005, 44, 18, 6431-6438.

Z. Kristallog., 1997, 212, 313-314.

* cited by examiner

*Primary Examiner* — Devina Pillay

(74) *Attorney, Agent, or Firm* — US Naval Research Laboratory; Fariborz Moazzam

(57) ABSTRACT

A new compound $(NH_4)_3H_2[BOB(PO_4)_3]$ was prepared and found to conduct protons under a variety of temperature conditions relevant to fuel cell operation. Also described is the related material $Rb_x(NH_4)_{3-x}H_2(BOB(PO_4)_3)$ where 0>x≥3.

9 Claims, 4 Drawing Sheets

AMMONIUM BOROPHOSPHATE AS A PROTON CONDUCTING SOLID ELECTROLYTE FOR SOLID ACID FUEL CELLS

CROSS-REFERENCE TO RELATED APPLICATIONS

This application claims the benefit of U.S. Provisional Patent Application No. 63/356,082 filed on Jun. 28, 2023, the entirety of which is incorporated herein by reference.

This application is related to U.S. Pat. No. 11,296,346, as well as U.S. patent application Ser. No. 18/096,602 filed on Jan. 13, 2023.

FEDERALLY-SPONSORED RESEARCH AND DEVELOPMENT

The U.S. Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 211093.

BACKGROUND

Borophosphate materials typically form two- and three-dimensional networks due to the high number of potential coordination sites of the phosphate ion ($PO_4^{3-}$). Only a few other examples of one-dimensional (1D) borophosphates are known [Z. Kristallog., 1995, 210, 446-447; Z. Kristallog., 1996, 211, 705-706; Z. Kristallog., 1997, 212, 313-314; Inorg. Chem., 2005, 44, 6431-6438]. These previous works generally highlight only the structure of the material and, occasionally, their thermal decomposition. As such, their physical properties are severely underexplored.

A need exists for the development and characterization of new borophosphate compounds.

BRIEF SUMMARY

One embodiment is the compound $(NH_4)_3H_2[BOB(PO_4)_3]$.

A second embodiment is a method of preparing $(NH_4)_3H_2[BOB(PO_4)_3]$ by mixing $(NH_4)_2HPO_4$ and $H_3BO_3$ in an ionic liquid (such as 1-butyl-3-methylimidazolium bromide) and subjecting the mixture to greater than standard temperature, thereby obtaining $(NH_4)_3H_2[BOB(PO_4)_3]$.

A third embodiments includes electrochemical devices with $(NH_4)_3H_2[BOB(PO_4)_3]$ configured as a separator membrane and/or electrode thereof.

A fourth embodiment encompasses mixed ammonium-rubidium one-dimensional borophosphates of the formula $Rb_x(NH_4)_{3-x}H_2(BOB(PO_4)_3)$ where $0>x\geq 3$.

A fifth embodiment includes preparing mixed ammonium-rubidium one-dimensional borophosphates of the fourth embodiment by using a method of the second embodiment modified by substituting up to three molar equivalents of $(NH_4)_2HPO_4$ with equimolar amounts of $Rb_2HPO_4$.

A sixth embodiment entails the use of borophosphates having a structure comparable to $(NH_4)_3H_2(BOB(PO_4)_3)$ as proton-conducting electrolytes for fuel cells, such borophosphates including $Rb_3H_2(BOB(PO_4)_3)$ (which is isostructural with $(NH_4)_3H_2(BOB(PO_4)_3)$); $Na_5(BOB(PO_4)_3)$; related compositions having varying cation and proton content such as $M^{n+}_{x/n}H_{5-x}(BOB(PO_4)_3)$, where $0>x\geq 5$ and M is a metal with positive charge n (e.g., 1+, 2+, 3+); and compositions with mixed/multiple cations according to the above examples, such as $Rb_x(NH_4)_{3-x}H_2(BOB(PO_4)_3)$ where $0>x\geq 3$.

DETAILED DESCRIPTION

Definitions

Figure 1:
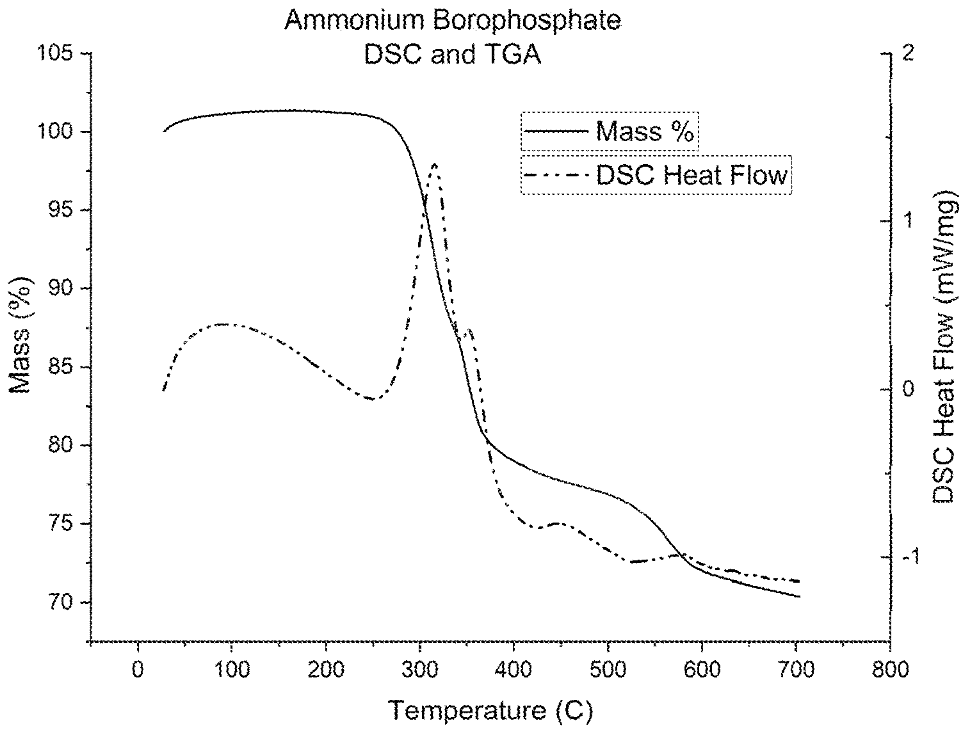
FIG. 1 depicts thermogravimetric analysis (black line) and differential scanning calorimetry (red line) of $NH_4(B[SO_4]_2)$ run at 10 K $min^{-1}$ under an argon/oxygen environment, showing three-stage mass loss above 265° C.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "standard temperature and pressure" refers to a temperature of 20° C. and a pressure of one atmosphere.

Overview

The borophosphates described herein were investigated due to structural similarities to another class of 1D materials, the borosulfates (e.g. $NH_4[B(SO_4)_2]$), which show impressive anhydrous and low-humidity proton conduction.

Chemical intuition suggests that 1D borophosphates should be equally successful as proton conducting electrolytes due to strong hydrogen bonding interactions and proton-hopping pathways along a chemically robust polymer backbone containing B—O—B linkages.

As previously described, borosulfate compounds of various cations (such as ammonium, potassium, and sodium) are excellent proton conductors. This spurred a search for other compounds with similar one-dimensional (1D) anionic chains of condensed acids, starting with a structure search of known 1D borophosphates. A variety of 1D borophosphate structures, including $K_5[BOB(PO_4)_3]$, have been reported in the literature. In the course of attempting to reproduce the literature syntheses, $(NH_4)_3H_2[BOB(PO_4)_3]$ was isolated which is believed to be a new and previously unreported borophosphate compound that is isostructural with $Na_5[BOB(PO_4)_3]$. Electrochemical impedance spectroscopy (EIS) measurements performed on at least three other borophosphate compounds found that all of them displayed at least some proton conductivity. $(NH_4)_3H_2[BOB(PO_4)_3]$ displayed the best conductivity of the compounds that have been tested so far, being in line with the conductivity previously measured for potassium borosulfate, $K[B(SO_4)_2]$. Hence, it is believed that the borophosphates are an entire class of proton-conducting, one-dimensional anion chain compounds containing the $[BOB(PO_4)_3]_n^{5n-}$ moiety, and that this proton conductivity is a property that is related to their structural similarity to the 1D borosulfates.

The newly synthesized and structurally characterized ammonium borophosphate material, $(NH_4)_3H_2[BOB(PO_4)_3]$, joins a family of similarly structured 1D borophosphates with a B—O—B backbone. Of the previously-described materials (the $Na^+$ analogue [Z. Kristallog., 1995, 210, 446-447] and the $Rb^+$ analogue [Inorg. Chem., 2005, 44, 6431-6438]), no measurements were made of conductivity or mechanical and chemical stability, and only the $Rb^+$ analogue had its thermal stability characterized. The existence of these 1D borophosphates, as well as the ammonium analogue, demonstrates that the repeating pentavalent $[BOB(PO_4)_3]_n^{5n-}$ building unit can be charge-balanced with various cations. The polyanionic backbone can either be protonated at some of the $PO_4$ sites, such as in the $Rb^+$ or $NH_4^+$ analogues, or completely deprotonated, as is in the $Na^+$ analogue. This allows for tunability in the proton conduction pathway.

A synthesis of a number of B—O—B borophosphates having a structure comparable to $(NH_4)_3H_2(BOB(PO_4)_3)$ in ionic liquid is possible, including those forms with $NH_4$, Na, and Rb. Such borophosphates include $Rb_3H_2(BOB(PO_4)_3)$ (which is isostructural with $(NH_4)_3H_2(BOB(PO_4)_3)$); $Na_5(BOB(PO_4)_3)$; and related compositions having varying cation and proton content such as $M^{n+}_{x/n}H_{5-x}(BOB(PO_4)_3)$, where 0>x≥5 and M is a metal with positive charge n (e.g., 1+, 2+, 3+); and compositions with mixed/multiple cations according to the above examples, such as $Rb_x(NH_4)_{3-x}H_2(BOB(PO_4)_3)$ where 0>x≥3.

EXAMPLES

Synthesis and Purification of $(NH_4)_3H_2[BOB(PO_4)_3]$. Narrow, plate-like prismatic crystallites of $(NH_4)_3H_2[BOB(PO_4)_3]$ were prepared by solvothermal reaction of the dissolved reactants in a common and widely available ionic liquid in a high pressure reaction vessel. The methodology involves mixing 0.531 g (4 mmol) $(NH_4)_2HPO_4$ and 0.241 g (4 mmol) $H_3BO_3$ in 5.3 g (24 mmol) of 1-butyl-3-methylimidazolium bromide inside a Teflon-lined steel autoclave. The samples were heated at 200° C., statically and at autogenous pressure, for 5 days. The mother ionic liquid was decanted and the colorless, crystalline product was washed with dry ethanol before being dried in an overnight vacuum oven at 50° C. The structure of the sample $(NH_4)_3H_2[BOB(PO_4)_3]$ was determined with single crystal X-ray diffraction (SCXRD) and its bulk purity was confirmed by powder X-ray diffraction (PXRD).

Preparation of Sintered, Monolithic Discs of $(NH_4)_3H_2[BOB(PO_4)_3]$. Sintered discs of $(NH_4)_3H_2[BOB(PO_4)_3]$ were prepared using a Carver press equipped with resistively heated platens. Samples (approx. 0.075-0.200 g) were loaded in a ½" diameter die and pressed to ~7000 lbs. (~35,000 psi). The platens were then heated to 100° C., during which the applied force was kept at ~7000 lbs. The sample was held at this pressure and temperature overnight and then recovered. PXRD of the recovered discs gives the expected pattern for $(NH_4)_3H_2[BOB(PO_4)_3]$. The recovered discs ranged in thickness from 0.40 to 0.80 mm. For a sample of ½" diameter with a thickness of 1 mm, the calculated density of the sample is 1.828 $g/cm^3$, which is in good agreement with the crystallographic (maximum) density of 2.000 $g/cm^3$ and demonstrates minimal porosity.

Figure 4:
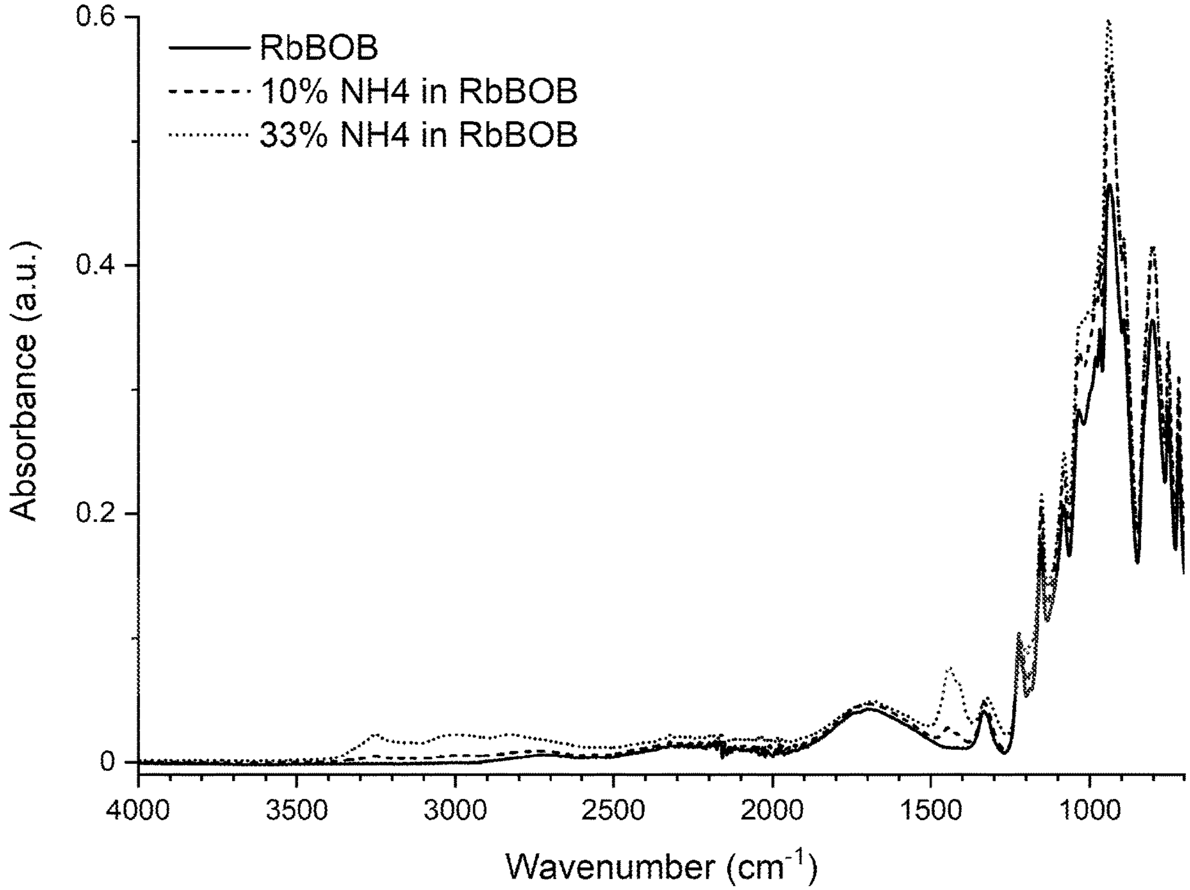
FIG. 4 provides infrared spectra of $Rb_x(NH_4)_{3-x}H_2(BOB(PO_4)_3)$ where x=3 (solid line), 2.7 (dashed line), and 2.0 (dotted line), showing growth of $NH_4^+$-associated peaks with increasing $NH_4$ content, contrasting with powder X-ray diffraction (not shown) that exhibits only peaks for $Rb_3H_2(BOB(PO_4)_3)$.

Synthesis and Purification of $Rb_x(NH_4)_{3-x}H_2(BOB(PO_4)_3)$. Mixed ammonium-rubidium one-dimensional borophosphates of the formula $Rb_x(NH_4)_{3-x}H_2(BOB(PO_4)_3)$, where 0>x≥3, were prepared as described above but modified by substituting up to three molar equivalents of $(NH_4)_2HPO_4$ with equimolar amounts of $Rb_2HPO_4$. FIG. 4 provides infrared spectra of three such materials.

Thermal Gravimetric Analysis. Thermal gravimetric analysis (TGA) and differential scanning calorimetry (DSC) of $(NH_4)_3H_2[BOB(PO_4)_3]$ did not reveal any mass loss or phase changes below 260° C. Decomposition of the sample began at ~265° C., losing about 20% of the sample mass from 270-360° C. DSC found a small shoulder endotherm associated with this decomposition as well, occurring approximately at 340° C. A second loss step began at ~460° C., leading to a loss of a further 10% of the mass up to ~600° C., whereupon no other phase changes were observed. It is evident that the sample is stable up to at least 260° C. Data are provided in FIG. 1.

Figure 3:
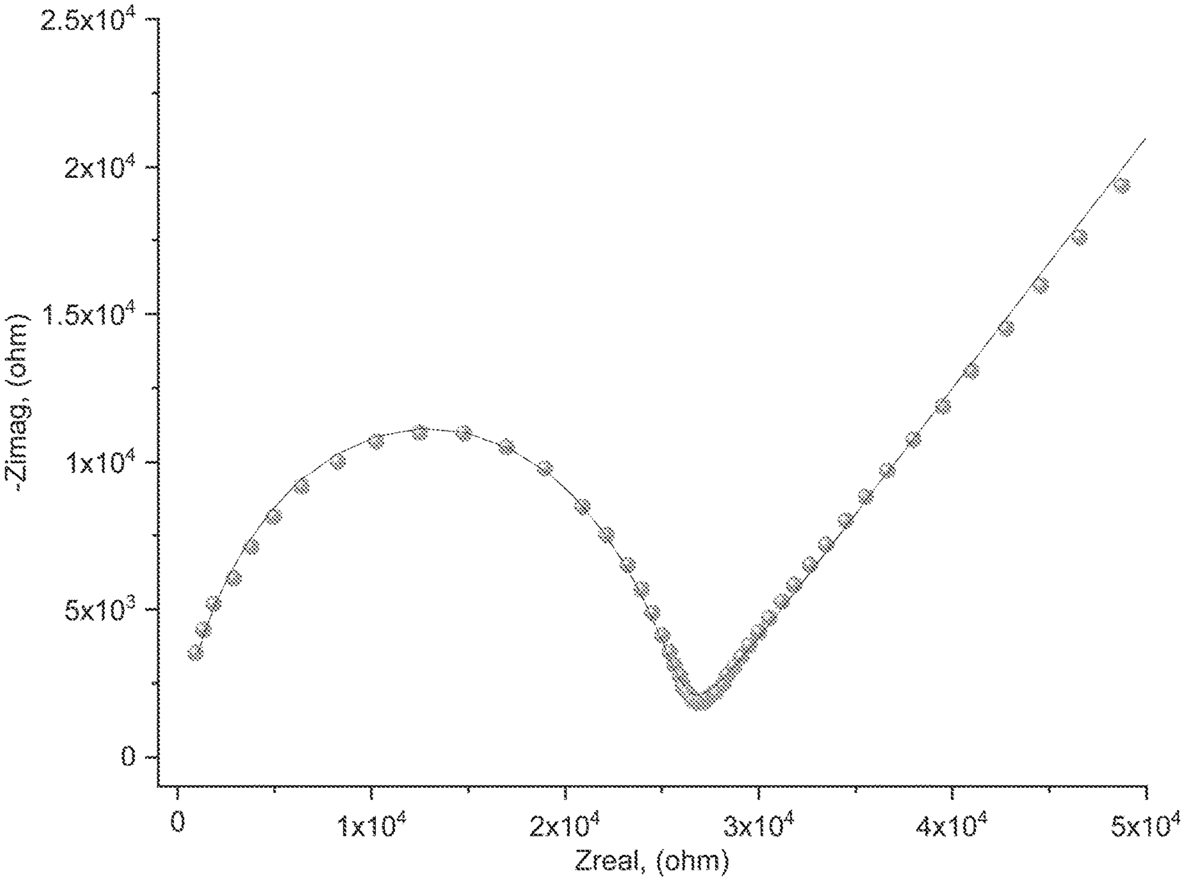
FIG. 3 shows a characteristic Nyquist plot of imaginary (capacitive) vs. real (resistive) impedance for an ammonium borophosphate ($(NH_4)_3H_2[BOB(PO_4)_3]$) disc from which conductivity is calculated. The spectrum shape of a semicircle and line is characteristic of ionic, rather than electronic, conduction.
Figure 5:
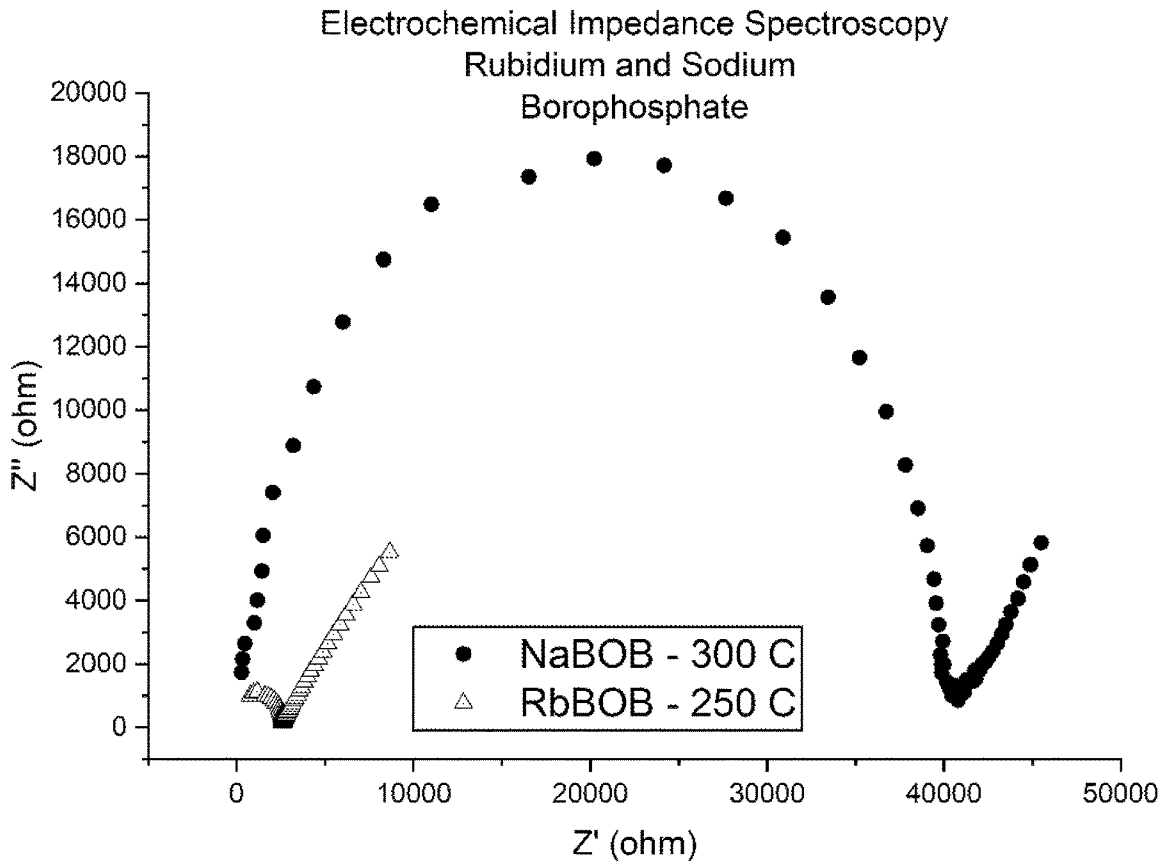
FIG. 5 depicts results from impedance spectroscopy of $Na_5(BOB(PO_4)_3)$ (solid circles) and $Rb_3H_2(BOB(PO_4)_3)$ (open triangles) showing clear ionic conductivity at 300° C. and 250° C., respectively.

Ionic Conductivity Measurements by Impedance Spectroscopy. Conductivity measurements by impedance spectroscopy over the frequency range of 1 MHz to 1 Hz were performed using a Gamry Instruments Reference 3000 potentiostat. An as-prepared sintered disc of $(NH_4)_3H_2[BOB(PO_4)_3]$ (½" diameter) was placed between two flat, disc-shaped porous stainless steel electrodes (½" diameter), where the electrolyte contact side was coated by a spray-deposited layer of gold (approximately 60 nm thick). High temperature Viton rubber O-rings (½" inner diameter) were used to hold the three-part configuration in a two-sided aluminum electrochemical cell, separated by a Teflon gasket. Electrodes were attached to each side of the aluminum cell and the entire device was placed into a convection oven for temperature-dependent measurements. Measurements were taken in increments up to 210° C. with data provided in FIG. 3. $Na_5(BOB(PO_4)_3)$ and $Rb_3H_2(BOB(PO_4)_3)$ were analyzed similarly, with data provided in FIG. 5.

Figure 2:
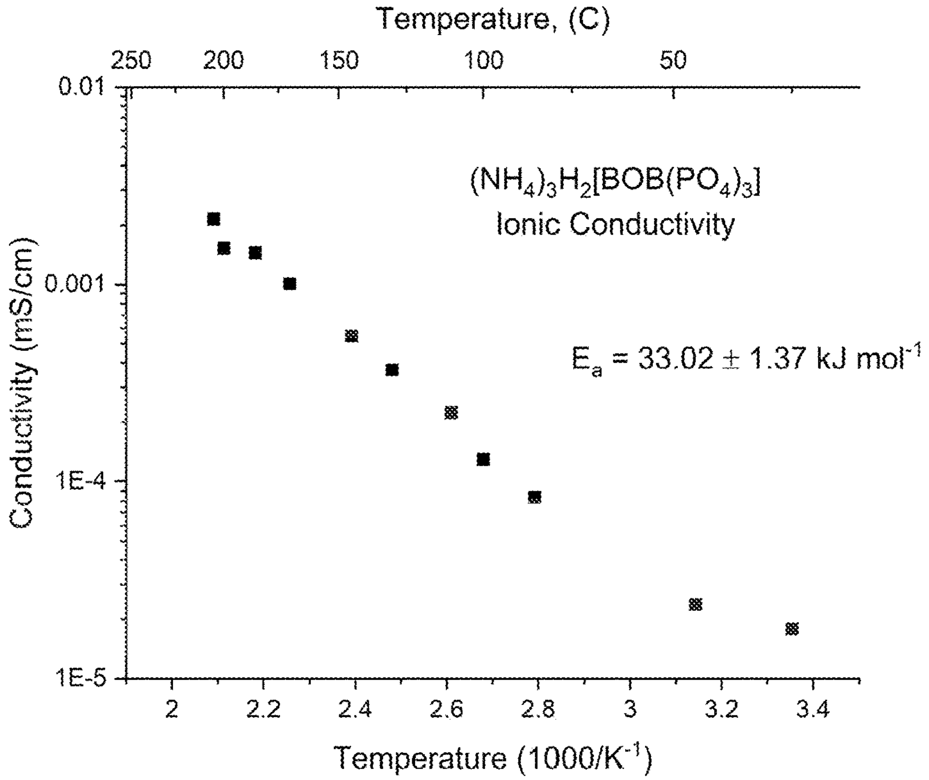
FIG. 2 is plot of calculated conductivity for an ammonium borosulfate disc upon heating from 25° C. to 210° C. under air in a convection oven. The data was fit to an Arrhenius conductivity model, allowing a determination of the estimated activation energy ($E_a$) of 33.02±1.37 kJ $mol^{-1}$.

Measurements at Ambient Humidity up to 210° C. Measurements were conducted in an oven open to humidity-uncontrolled atmosphere, although relative humidity is expected decrease toward 0.15% at or above 200° C. due to the low partial pressure of saturated water vapor in air at 25° C. Initial impedance measurements of the as-prepared sintered disc gave calculated ionic conductivity on the order $10^{-5}$ mS/cm at 25° C. Upon stepwise heating of the sample toward 210° C. (the temperature limit of the oven), conductivity of the sample increased by approximately two orders of magnitude ($2\times10^{-3}$ mS/cm at 210° C.). Additional ionic conductivity measurements were performed after a period of approximately 16 hours at or above 200° C. under a stream of dry air to effectively dry out the disc and ensure that ionic conductivity would be intrinsic to the material and have water be a minimal factor in overall conductivity. Conductivities calculated from cooling form 210° C. to 45° C. decrease from $10^{-6}$ mS/cm to $10^{-8}$ mS/cm. Data are provided in FIG. 2.

Further Embodiments

While the $(NH_4)_3H_2[BOB(PO_4)_3]$ was prepared using 1-butyl-3-methylimidazolium bromide as the ionic liquid, is expected that other ionic liquids (e.g., 1-ethyl-3-methylimidazolium chloride, 1-allyl-3-methylimidazolium dicyanamide, 1-butyl-1-methylpiperidinium bis(trifluoromethylsulfonyl)imide) could also serve for the synthesis. Likewise, rather than the employed conditions of 200° C. under accompanying autogenous pressure, other reaction conditions could be used. Because the product is stable at 260° C., the reaction could be conducted at temperatures as low as room temperature and as high as 260° C.; elevated temperatures are utilized primarily to increase the rate of reaction. The role of pressure in the synthesis has not yet been explored, but it is expected that the reaction would proceed at pressures both below and above standard conditions. The reaction may be conducted under pressures from static vacuum up to many times atmospheric pressure.

It is expected that proton-conducting borophosphates as described herein could serve as critical components of electrochemical devices such as proton exchange membrane hydrogen fuel cells (not to be conflated with polymer electrolyte membrane fuel cells), proton-conducting electrolytes for fuel cells, proton exchange electrolizers, flow batteries, and the like. Such applications are outlines in commonly-owned U.S. Pat. No. 11,296,346, incorporated herein by reference for the purposes of disclosing such uses of proton conductors.

Advantages $(NH_4)_3H_2[BOB(PO_4)_3]$ exhibits ionic conductivity—measured by electrochemical impedance spectroscopy—similar to previously reported solid acid electrolytes, yet does not require additional humidification to maintain conductivity at an increased operating temperature window. The magnitude of ionic conductivity observed under ambient conditions is likely to improve further at both higher temperatures and with active humidification. The stability of $(NH_4)_3H_2[BOB(PO_4)_3]$ extends the operational temperature window above that of other known solid acid materials. Operation at such elevated temperatures potentially allows for lower catalyst loadings/usage of cheaper catalyst materials altogether, as well as allowing for hydrogen-powered fuel cells utilizing a proton conducing electrolyte to be operated at temperatures above 250° C. without the need for active humidification, which is a significant technological achievement.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. The compound $(NH_4)_3H_2[BOB(PO_4)_3]$.

2. The compound of claim 1, in the form of a one-dimensional polymer.

3. A method of preparing $(NH_4)_3H_2[BOB(PO_4)_3]$, the method comprising:

mixing $(NH_4)_2HPO_4$ and $H_3BO_3$ in an ionic liquid; and subjecting the mixture to greater than standard temperature, thereby obtaining $(NH_4)_3H_2[BOB(PO_4)_3]$.

4. The method of claim 3, wherein said ionic liquid is 1-butyl-3-methylimidazolium bromide.

5. The method of claim 3, wherein the mixture is subjected to a temperature of between 100 and 300° C.

6. An electrochemical device comprising:

$(NH_4)_3H_2[BOB(PO_4)_3]$ configured as a separator membrane and/or electrode of the electrochemical device, wherein the electrochemical device is selected from the group consisting of hydrogen fuel cells, flow batteries, and electrolyzers.

7. The electrochemical device of claim 6, being operable at temperatures ranging from about 150 to about 300° C.

8. The electrochemical device of claim 6, wherein the electrochemical device is the flow battery; and wherein the flow battery comprises a first half cell comprising an anolyte and a second half cell comprising a catholyte.

9. The electrochemical device of claim 6, being operable at temperatures ranging from about 150 to about 300° C.

* * * * *